United States Patent [19]

Ahlert et al.

[11] Patent Number: 4,654,276

[45] Date of Patent: Mar. 31, 1987

[54] MAGNETIC RECORDING MEDIUM WITH AN UNDERLAYER AND A COBALT-BASED MAGNETIC LAYER

[75] Inventors: Richard H. Ahlert, San Jose; James K. Howard, Morgan Hill; Grace S. Lim, San Jose, all of Calif.

[73] Assignee: International Business Machines Corporation, Armonk, N.Y.

[21] Appl. No.: 857,019

[22] Filed: Apr. 29, 1986

[51] Int. Cl.$^4$ ............................................. B32B 15/00
[52] U.S. Cl. ................................. 428/641; 204/192.2; 360/134; 360/135; 360/136; 427/131; 427/132; 428/630; 428/634; 428/651; 428/652; 428/668; 428/670; 428/679; 428/680; 428/928
[58] Field of Search ................ 427/131, 132; 428/607, 428/611, 626, 630, 634, 641, 680, 651, 652, 670, 668, 678, 679; 360/134, 135, 136; 204/192 M

[56] References Cited

U.S. PATENT DOCUMENTS 3,321,328  5/1967  Koretzky ............................. 427/131
4,438,066  3/1984  Aboaf et al. ......................... 420/435

FOREIGN PATENT DOCUMENTS 140513  5/1985  European Pat. Off. .
145157  6/1985  European Pat. Off. .
57-205821  12/1982  Japan .................................... 427/667
59-198568  5/1984  Japan .
59-227107  12/1984  Japan .

OTHER PUBLICATIONS

Koretzky, "Electroless Deposition of Ferromagnetic Alloys" IBM Technical Disclosure Bulletin, vol. 5, No. 2, Jul. 1962, p. 59.
J. A. Aboaf, et al., "Magnetic Properties and Structure of Co-Pt Thin Films", IEEE Trans. on Magnetics, MAG-19, 1514 Jul. (1983).
M. Kitada, et al., "Magnetic Properties of Sputtered Co-Pt Thin Films", J. Appl. Phys. 54(12), Dec. 1983, pp. 7089-7094.
J. E. Opfer, et al., "Thin Film Memory Disc Development," Hewlett-Packard Journal, Nov. 1985, pp. 4-10.
R. R. Dubin, et al., "Degradation of Co-Based Thin-Film Recording Materials in Selected Corrosive Environments," J. Apply. Phys. 53(3), Mar. 1982, pp. 2579-2581.
Hansen, *Constitution of Binary Alloys*, McGraw Hill, 1958, p. 519.

*Primary Examiner*—John P. Sheehan
*Attorney, Agent, or Firm*—Thomas R. Berthold

[57] ABSTRACT

An improved cobalt-platinum (CoPt) thin film metal alloy media for horizontal magnetic recording has a coercivity substantially greater than prior CoPt thin film metal alloy media. A tungsten underlayer between the substrate and the CoPt magnetic layer improves the coercivity above that of media wiht conventional underlayers, such as chromium. The coercivity of the CoPt layer can be increased even further if the CoPt film is deposited in such a manner as to form an intermetallic compound of $Co_3W$ in the interface region between the tungsten underlayer and the CoPt magnetic layer. The tungsten underlayer also improves the magnetic properties of the media when the magnetic layer is an alloy of cobalt-platinum-chromium (CoPtCr).

12 Claims, 4 Drawing Figures

MAGNETIC RECORDING MEDIUM WITH AN UNDERLAYER AND A COBALT-BASED MAGNETIC LAYER

BACKGROUND OF THE INVENTION

1. Field of the Invention

This invention relates to thin film metal alloy magnetic recording media, and in particular to a thin film metal alloy disk for horizontal magnetic recording in which an alloy comprising cobalt and platinum forms the magnetic layer.

2. Description of the Prior Art

Alloys of cobalt and platinum with various percentages of platinum concentration have been used as the magnetic material in thin film magnetic recording disks for horizontal recording. In such disks, the hexagonal close packed (HCP) crystalline structure of the cobalt-platinum (CoPt) alloy is formed on the substrate, or on an intermediate underlayer, so that the C-axis, i.e. the [002] axis, of the CoPt film is either in the plane of the film or has a component in the plane of the film.

The coercivity ($H_c$) of CoPt films is dependent upon the composition of the platinum, with the maximum $H_c$ occurring at approximately 20 atomic percent (at. %) platinum. See J. A. Aboaf, et al., "Magnetic Properties and Structure of Co-Pt Thin Films", IEEE Trans on Magnetics, MAG-19, 1514 (1983), and M. Kitada, et al., "Magnetic Properties of Sputtered Co-Pt Thin Films", *J. Appl. Phys.* 54 (12), December 1983, pp. 7089-7094. The coercivity and other properties of cobalt-platinum films have been reported by Opfer, et al. in an article entitled "Thin-Film Memory Disc Development," *Hewlett-Packard Journal*, November 1985, pp. 4-10.

A thin film disk with a cobalt-platinum-chromium (CoPtCr) magnetic layer, wherein Cr is added to improve the corrosion resistance of magnetic layer, is described in Japanese patent application No. 198568, published May 22, 1984. The CoPtCr magnetic layer is deposited onto a nickel-phosphorus (NiP) film formed on a suitable substrate.

In order to improve the coercivity of the CoPt magnetic film in certain types of disks, a chromium (Cr) underlayer is often formed between the substrate and the CoPt magnetic layer. The use of a chromium underlayer in a CoPt thin film disk is described in the above referenced article by Opfer, et al. and in European patent application No. 145157, published June 19, 1985 and assigned to the Hewlett-Packard Company.

The use of tungsten (W) as an enhancement layer in certain types of thin film disks for horizontal recording has been suggested in an article by Dubin, et al. in "Degradation of Co-based Thin-film Recording Materials in Selected Corrosive Environments," *J. Appl. Phys.* 53(3), March 1982, pp. 2579-2581. The Dubin, et al. article states that a 1000 Å thick underlayer of tungsten is used to promote epitaxial crystal growth in magnetic layers of cobalt-nickel-tungsten (CoNiW) and cobalt-nickel (CoNi).

In Japanese unexamined patent application No. 59-227107, published Dec. 19, 1984, a magnetic recording medium is described in which the magnetic film contains cobalt, platinum and tungsten, with platinum comprising between 4 and 15 at. % and tungsten comprising between 0.5 and 8 at. % of the CoPtW alloy. This Japanese reference indicates that greatly improved coercivity is obtained by adding tungsten to the cobalt-platinum alloy.

Co-pending application Ser. No. 791,963, assigned to the same assignee as this application, describes a specifically deposited layer of an intermetallic compound, such as cobalt-tungsten, ($Co_3W$), to form a nucleating layer for a subsequently deposited magnetic film for vertical recording.

European patent application No. 140513, published May 8, 1985 and assigned to the same assignee as this application, suggests various combinations of underlayers and magnetic layers as structures for horizontal magnetic recording, including a CoPt magnetic layer formed on a nonmagnetic layer of a WCo alloy.

SUMMARY OF THE INVENTION

The present invention is an improved CoPt or CoPtCr thin film magnetic recording disk for horizontal recording and incorporates a nonmagnetic underlayer of tungsten between the substrate and the CoPt or CoPtCr magnetic layer to improve the coercivity. The tungsten underlayer and the magnetic layer are deposited so as to form an intermetallic compound, $Co_3W$, at the interface between the tungsten and magnetic layers.

With the use of a tungsten underlayer and the deposition of the underlayer and magnetic layers in a manner so as to form the intermetallic compound in the interface region, the coercivity of CoPt or CoPtCr disks can be improved, or in the alternative, the same coercivity can be achieved with less platinum.

For a further understanding of the nature and advantages of the present invention, reference should be made to the following detailed description taken in conjunction with the accompanying drawings

DESCRIPTION OF THE PREFERRED EMBODIMENT

Figure 1:
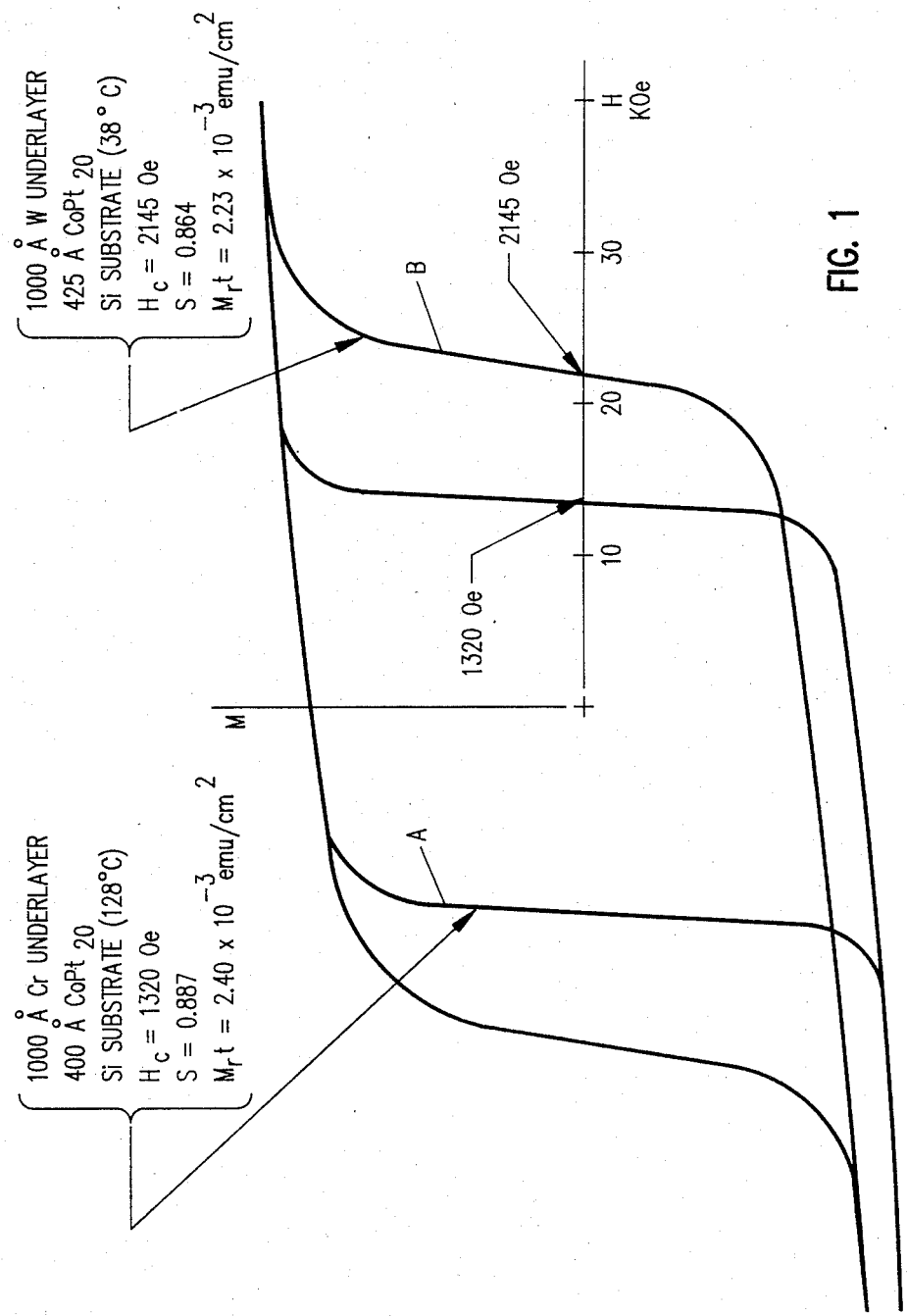
FIG. 1 illustrates M-H hysteresis loops which show the comparison of a CoPt film formed on a tungsten underlayer with a CoPt film formed on a chromium underlayer.

In order to note the improved coercivity of the CoPt disk made according to the present invention, a CoPt disk was first made with a chromium underlayer between the substrate and the CoPt magnetic layer. A chromium underlayer of 1000 Å thickness was deposited by DC magnetron sputtering onto a silicon substrate at an Argon pressure of $3.2 \times 10^{-3}$ Torr and a substrate temperature of 128° C. Thereafter, a 400 Å thick cobalt-platinum alloy film with 20 at. % platinum ($Co_{80}Pt_{20}$) was sputter deposited onto the chromium underlayer without breaking vacuum in the sputtering chamber. Curve A in FIG. 1 is an M-H hysteresis loop for this film and illustrates a coercivity $H_c$ of 1320 Oersteds (Oe) and a squareness S of 0.887. Curve B is an M-H loop for a cobalt-platinum film of similar thickness deposited onto a tungsten underlayer. In accordance with the present invention, a 1000 Å thick tungsten underlayer was deposited by DC magnetron sputtering onto a silicon substrate with the substrate maintained at a temperature of 38° C. Thereafter, without breaking vacuum in the sputtering chamber, a 425 Å thick $Co_{80}Pt_{20}$ film was sputter deposited onto the tungsten underlayer. The resulting M-H hysteresis loop (Curve B of FIG. 1) illustrates for this film a coercivity of 2145 Oe and a squareness S of 0.864. For the two disks whose data is depicted in FIG. 1, the same $Co_{80}Pt_{20}$ sputtering target was used.

Cobalt-platinum films of various thicknesses were formed on tungsten underlayers at various substrate deposition temperatures, and the magnetic properties of these films were compared with cobalt-platinum films formed on chromium underlayers. As shown by Curve A in FIG. 2, the various experimental samples had $Co_{80}Pt_{20}$ thicknesses ranging between approximately 240 and 640 Å and were sputter deposited onto 1000 Å thick tungsten underlayers while the silicon substrate temperature was maintained between approximately 30° and 40° C. The coercivity values for such films were substantially greater than the coercivity of $Co_{80}Pt_{20}$ films deposited onto 1000 Å thick chromium underlayers while the silicon substrate temperature was maintained at approximately 128° C., as shown by Curve C in FIG. 2. (The coercivity of the Si/1000 Å Cr/400 Å $Co_{80}Pt_{20}$ disk of FIG. 1 is significantly less than the corresponding disk in Curve C of FIG. 2 because the latter was made with a different $Co_{80}Pt_{20}$ sputtering target, which may have had slight variations in composition).

When the temperature of the silicon substrate was increased from approximately 30° to 40° C. to 128° C. and $Co_{80}Pt_{20}$ films of the same thickness range were deposited onto the 1000 Å thick tungsten underlayers, the resulting coercivities were substantially reduced, but still substantially higher than for the CoPt samples formed on chromium underlayers. (See Curve B in FIG. 2.)

Figure 2:
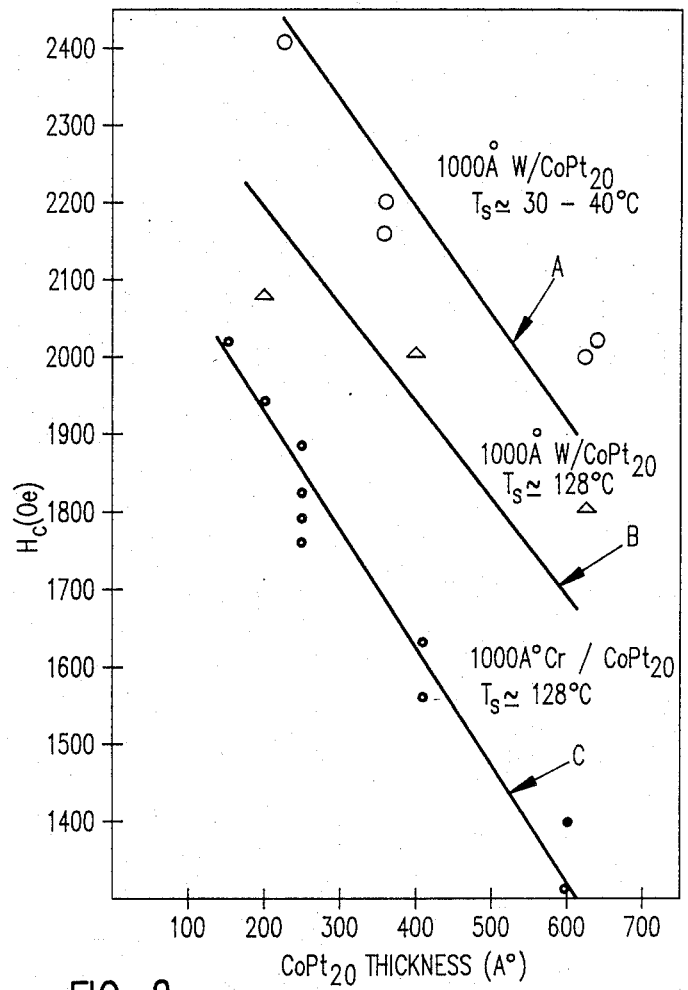
FIG. 2 is a graphical representation of the coercivity of CoPt films of various thicknesses deposited on tungsten and chromium underlayers at various substrate deposition temperatures.
Figure 3:
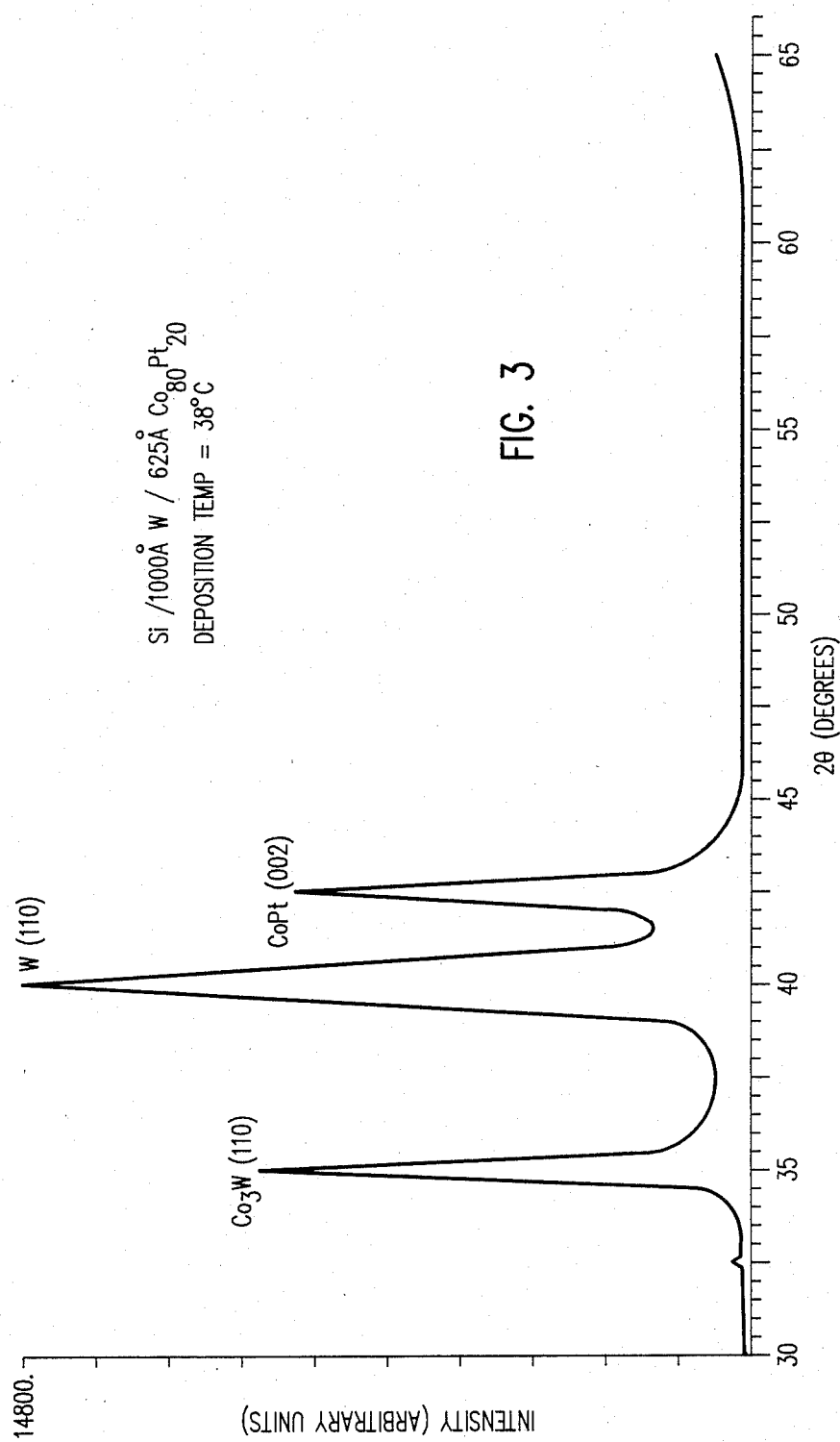
FIG. 3 is an X-ray diffraction curve for a CoPt film deposited on a tungsten underlayer wherein the interfacial region between the tungsten and the CoPt layer is an intermetallic compound of $Co_3W$.

In order to understand the difference in coercivity of the $Co_{80}Pt_{20}$ films depicted by Curves A and B in FIG. 2, an X-ray diffraction analysis was performed on the silicon disks with the $Co_{80}Pt_{20}$ film deposited onto the tungsten underlayers. The X-ray diffraction curve of FIG. 3 is for a silicon disk with a 1000 Å thick W underlayer and a 625 Å thick $Co_{80}Pt_{20}$ magnetic layer deposited at a silicon substrate temperature of 38° C. FIG. 3 depicts a peak intensity at $2\theta$ equal to 42.62 degrees, which corresponds to the (002) plane of the HCP $Co_{80}Pt_{20}$ magnetic film and a peak intensity at $2\theta$ equal to 39.7 degrees, which corresponds to the (110) plane of the body-centered-cubic (BCC) tungsten underlayer. In addition, a peak intensity at $2\theta$ equal to 35.25 degrees corresponds to the (110) plane of the HCP $Co_3W$ intermetallic compound. This peak in FIG. 3 confirms that an intermetallic compound phase of cobalt and tungsten is present at the interfacial region between the $Co_{80}Pt_{20}$ and W layers. The (110) reflection for the HCP $Co_3W$ implies that a component of the C-axis [002] of the $Co_3W$ is in the plane of the film. The (110) reflection for $Co_3W$ was not detected in an X-ray diffraction analysis of $Co_{80}Pt_{20}$ films on tungsten underlayers deposited at 128° C. (i.e. those disks whose data is shown by Curve B in FIG. 2). Thus, the results shown in FIG. 3 indicate that the relatively low temperature deposition of $Co_{80}Pt_{20}$ on a tungsten underlayer causes an interfacial reaction between Co and W, which results in a highly oriented hexagonal $Co_3W$ phase at the interface. This interface enhances the C-axis orientation of the $Co_{80}Pt_{20}$ film in the plane of the film.

Figure 4:
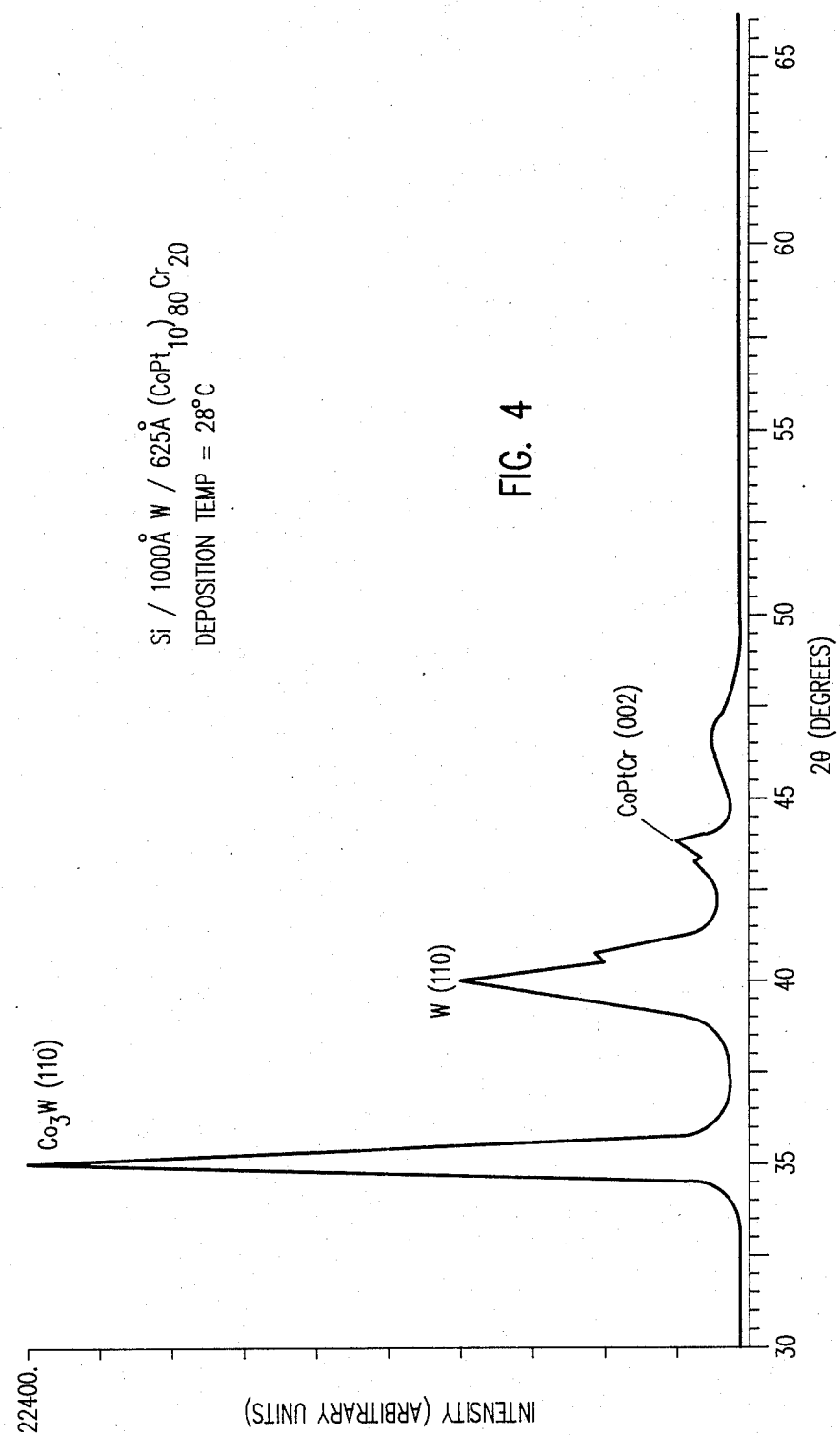
FIG. 4 is an X-ray diffraction curve for a CoPtCr film deposited on a tungsten underlayer wherein the interfacial region between the tungsten and the CoPtCr layer is an intermetallic compound of $Co_3W$.

A thin film disk with a 625 Å thick $(Co_{90}Pt_{10})_{80}Cr_{20}$ magnetic layer deposited onto a 1000 Å thick W underlayer on a silicon substrate also showed excellent magnetic properties. This disk was formed by DC magnetron sputtering using separate $Co_{90}Pt_{10}$ and Cr targets at a substrate temperature of 28° C. The disk had $H_c=970$ Oe, coercivity squareness $S^*=0.89$ and a remanance-thickness product $Mr.t=1.68\times10^{-3}$ emu/cm$^2$. The X-ray diffraction analysis of this disk is shown in FIG. 4 and depicts a strong peak intensity at $2\theta=35.16°$, which corresponds to the (110) plane of the $Co_3W$ interface region, thereby confirming the formation of the $Co_3W$ interface between the W underlayer and $(Co_{90}Pt_{10})_{80}Cr_{20}$ magnetic layer.

As used herein the term "intermetallic compound" refers to those chemical compositions which are more than a simple mixture in the form of an alloy, but in which the constituents are present in a fixed stoichometric ratio so that the composition can be essentially represented by a chemical formula. An intermetallic binary compound of two elements, such as cobalt and tungsten, is an intermediate phase which exists only at the discrete stoichometric ratio of three atoms of cobalt to one atom of tungsten. The $Co_3W$ intermetallic compound is indicated on the published phase diagrams for cobalt and tungsten, such as in *Constitution of Binary Alloys*, McGraw Hill, 1958, p. 519.

In all the experimental examples described herein the substrate was semiconductor grade single-crystal silicon. When a silicon substrate is used, an underlayer is required to cause the C-axis orientation of the magnetic layer to be in the plane of the film. The tungsten underlayer of the present invention serves this purpose. When the substrate is other material, such as a nickel-phosphorus (NiP) film formed on an aluminum alloy disk, however, an underlayer may not be absolutely necessary but only beneficial to improve the in-plane C-axis orientation of the magnetic layer. The tungsten underlayer of the present invention enhances the in-plane C-axis orientation of the magnetic layer and thereby improves the magnetic properties of the thin film disk when the substrate is a NiP film on an aluminum alloy disk.

While the experimental examples described herein were limited to the use of tungsten as the underlayer, other refractory metals such as niobium (Nb), molybdenum (Mo), and vanadium (V) would also likely enhance the orientation of the CoPt and CoPtCr film because such metals are known to form HCP intermetallic compounds with cobalt. These compounds are, respectively, $Co_2Nb$, $Co_3Mo$ and $Co_3V$.

The above description relates only to the formation of the magnetic layer and underlayer on the substrate in horizontal recording media and not to the well known aspects of the media and the media fabrication processes. For example, in the fabrication of thin film metal alloy disks it is known to provide a protective overcoat, such as a sputtered, essentially amorphous carbon film, over the magnetic layer and in certain instances to provide an adhesion layer, such as a sputtered film of titanium, between the overcoat and the magnetic layer.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording medium for horizontal recording comprising:
   a substrate;
   a nonmagnetic layer formed on the substrate from an element selected from the group consisting of tungsten, molybdenum, niobium and vanadium; and
   a magnetic layer of an alloy comprising cobalt and platinum formed on the nonmagnetic layer.

2. The magnetic recording medium according to claim 1 further comprising an intermetallic compound of cobalt and the element of the nonmagnetic layer at the interface of the nonmagnetic and magnetic layers.

3. The magnetic recording medium according to claim 1 wherein the alloy of the magnetic layer includes chromium.

4. The magnetic recording medium according to claim 2 wherein the element in the nonmagnetic layer is tungsten and wherein the intermetallic compound formed at the interface is $Co_3W$.

5. The magnetic recording medium according to claim 1 wherein the substrate is silicon.

6. The magnetic recording medium according to claim 1 wherein the substrate further comprises an aluminum alloy disk having a nickel-phosphorus surface film formed thereon.

7. The magnetic recording medium according to claim 1 further comprising a protective overcoat formed over the magnetic layer.

8. A magnetic recording medium for horizontal recording comprising:
   a substrate;
   a layer of tungsten formed on the substrate; and
   a magnetic layer of an alloy comprising cobalt, platinum and chromium formed on the tungsten layer, wherein an intermetallic compound of cobalt and tungsten is formed at the interface of the tungsten and magnetic layers.

9. A process for the fabrication of a magnetic recording medium comprising:
   providing a substrate;
   sputter depositing onto the substrate an element from the group consisting of tungsten, molybdenum, niobium and vanadium so as to form a nonmagnetic underlayer; and
   sputter depositing an alloy comprising cobalt and platinum onto the nonmagnetic underlayer so as to form a magnetic layer while maintaining the temperature of the substrate within a range sufficient to form an intermetallic compound interface between the magnetic layer and the underlayer, the intermetallic compound comprising cobalt and the element in the underlayer.

10. The process according to claim 9 wherein the step of sputter depositing an alloy comprises depositing an alloy comprising cobalt, platinum and chromium.

11. The process according to claim 9 wherein the step of sputtering depositing the element of the underlayer comprises the step of depositing tungsten.

12. The process according to claim 9 comprising the step of forming a protective overcoat over the magnetic layer.